Figure 1:
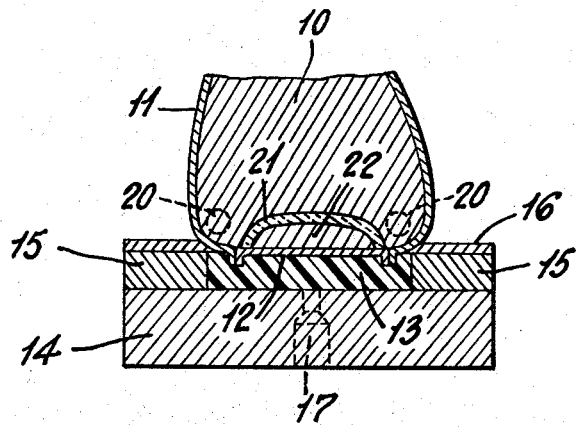

United States Patent

Maltby

[15] 3,676,542

[45] July 11, 1972

[54] MANUFACTURE OF FOOTWEAR

[72] Inventor: Frank Vincent Maltby, Don Mills, Ontario, Canada

[73] Assignee: Bata Shoe Company, Inc., Belcamp, Md.

[22] Filed: Oct. 2, 1969

[21] Appl. No.: 864,290

[30] Foreign Application Priority Data

Oct. 2, 1968 Great Britain..................46,874/68

[52] U.S. Cl.................................264/244, 18/30 US, 18/46, 264/257, 264/265, 264/273, 264/327
[51] Int. Cl....................B29h 7/08, B29f 1/022, A43d 65/00
[58] Field of Search..................264/244, 257, 265, 273, 327, 264/DIG. 65; 18/17 S, 19 S, 30 US, 34 S, 42 H, 46; 156/282, 290, 322

[56] References Cited

UNITED STATES PATENTS

| | | | |
|---|---|---|---|
| 2,830,924 | 4/1958 | Witt | 156/282 X |
| 3,441,643 | 4/1969 | Tusa et al. | 264/244 |

Primary Examiner—Robert F. White
Assistant Examiner—J. H. Silbaugh
Attorney—Holman & Stern

[57] ABSTRACT

When hot injection molding thermoplastic soles onto textile components the sole portion of the last is heated to achieve better bonding. In order to markedly increase production, only the peripheral part of the sole portion of the last is heated, the middle (remaining) part is maintained at an effectively lower temperature. This is accomplished by providing a last having either an insulating layer between the middle and peripheral parts thereof, or, marking the middle part entirely of insulating material.

4 Claims, 2 Drawing Figures

INVENTOR
FRANK VINCENT MALTBY

BY Holman, Glascock, Downing & Seebold

ATTORNEYS

MANUFACTURE OF FOOTWEAR

The present invention relates to the manufacture of shoes and like articles of footwear (e.g., boots, slippers and sandals), all hereinafter referred to as shoes and is an improvement in or modification of U.S. Pat. No. 3,441,643 which sets forth a method of manufacturing shoes having woven textile uppers, by injection-moulding, which comprises the steps of positioning a lasted upper with respect to a mold, heating the sole portion of the last to a temperature above the temperature which such portion would reach by the natural transfer of heat during an injection molding operation or a succession of said operations, and injecting plastic material in a hot molten condition into the mold to form a sole.

While the method of U.S. Pat. No. 3,441,643 enabled satisfactory adhesion to be obtained between the sole and the upper, it is an object of the present invention to retain the feature of satisfactory adhesion while enabling the sole to cool more quickly and thus permit increased production rates.

According to the present invention, a method of manufacturing shoes having woven textile uppers, by injection molding, comprises the steps of positioning a lasted upper with respect to a mold, heating the peripheral part of the sole portion of the last to a temperature above the temperature which such portion would reach by the natural transfer of heat during an injection molding operation or a succession of said operations while keeping the middle (remaining) part of the sole portion of the last at a temperature lower than that of the peripheral part, and injecting thermoplastic material in a hot molten condition into the mold to form a sole.

Preferably, the temperature to which said peripheral part is heated is of the order of 100° C while the temperature of said central part at least in the middle thereof is substantially lower.

Preferably passage of heat to said center part is restricted by insulating means.

Said insulating means may comprise an internal insulating layer in the last separating the middle part of the sole portion from the rest of the last. In another arrangement, the insulating means constitutes said middle part of the sole portion.

Preferably the last is formed with one or more internal recesses extending along a major part of its bottom portion adjacent said peripheral part and containing one or more electric heating elements.

Figure 2:
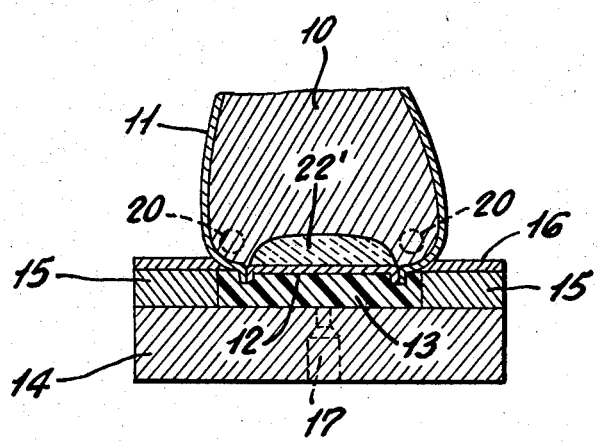

The following is a description, by way of example, of two embodiments of the present invention, reference being made to the accompanying diagrammatic drawings, in which:

FIG. 1 is a cross-sectional view of a lasted upper-and-insole unit applied to a mold; and FIG. 2 is the same view of another embodiment.

In both embodiments, the last 10 is solid and made of metal (preferably aluminum or cast iron) and is formed with one or more long internal recesses extending along a major part of its bottom portion adjacent the peripheral part of the sole portion of the last and containing one or more electric heating elements 20 adapted to heat the peripheral part to a suitable temperature, e.g., about 100° C. The last carries an upper-and-insole unit of a shoe, which unit comprises a canvas upper 11 and a canvas insole 12 jointed to the upper by stitching or otherwise. The lasted unit can be applied to the mouth of a mold comprising a base 14 and a pair of separate side members 15 which are slidable on the base to adjoin at the toe and heel ends thereof and which when they adjoin, form with the base a cavity having the shape of the ultimate thermoplastic sole. The side members are fitted with top plates 16 which in conjunction with the side members define a lip around the mouth of the mold cavity. An entry port 17 into the mold cavity is provided in the base 14 for receiving an injector nozzle. The peripheral part of the sole portion of the last is heated to a suitable temperature so as to heat the adjacent canvas of the upper. Hot molten thermoplastic material is injected into the mold cavity, which is closed by the lasted unit, to contact the canvas of the upper which is at a desired temperature. Any suitable means is provided for heating the thermoplastic material to be injected into the mold. Owing to the heating of the canvas of the upper before contact by the molten thermoplastic material good penetration of the canvas of the upper by the thermoplastic material occurs and thereby satisfactory adhesion is obtained between the upper and the sole. The mechanism of the superior penetration is explained in U.S. Pat. No. 3,441,643.

In the last shown in FIG. 1, an insulating layer 21 is provided separating the middle portion 22 of the sole portion of the last from the rest of the last. The middle portion 22 is itself made of the same of different metal as the rest of the last.

In the last shown in FIG. 2, the middle portion 22' of the sole portion of the last is itself made of insulating material.

Any suitable thermoplastic may be used for the sole, e.g., polyvinyl chloride, blends of polyvinyl chloride and acrylonitrile, polyvinyl chloride and ethyl vinyl acetate, and blends of polyurethane elastomers with polyvinyl chloride.

The insulating material used may be of any suitable kind. It should be understood that by insulating material is meant material having substantially lower thermal conductivity than the material of the last itself. The insulating material used in the last of FIG. 1 may for example be an epoxy, polyurethane or polyester resin or mixtures of such resins. One suitable material is the polyurethane resin sold under the trade name Adiprene (du Pont), if desired mixed with monochlorobisaniline sold under the trade name MOCA (Du Pont). The insulating material used in the last of FIG. 2 may be made of the same resins with or without a filler, e.g., silicon powder or granules.

In the embodiment of either FIGS. 1 or 2 a substantial portion of the sole portion of the last is kept comparatively cool thereby permitting the thermoplastic sole to cool more quickly.

EXAMPLE 1

A solid cast iron last with peripheral heating elements was heated to 110° C at the peripheral part of the sole portion thereof. The middle part 22 was made of copper and the insulating layer 21 was made of Adiprene, 3 millimeter thick. During injection with any suitable sole-forming thermoplastic material, the middle part of the last remained at about 75° C, thereby augmenting the cooling of the thermoplastic and increasing production.

EXAMPLE 2

A solid cast iron last as above was heated to 110° C. However, the middle part 22' was solid Adiprene, varying in thickness from 8 millimeters towards the heel of the last and 4 millimeters towards the toe. During production, the temperature of the middle part of the last remained about 50° C.

What I claim is:

1. In the production of shoes having a hot injection molded thermoplastic material outer sole adhered to a textile component in which a last having such textile component thereon is positioned in molding relation to a mold having a cavity adapted to receive thermoplastic outer sole-forming material, the improvement comprising the steps of heating the peripheral part of the sole portion of the last to such a degree and transferring heat therefrom to at least that peripheral area of such textile component that is to be adhered to the outer sole so as to raise the temperature of said textile peripheral area above that which would be reached by the natural transfer of heat during injection molding; insulating the remaining part of the sole portion of the last, and consequently that area of said textile component adjacent thereto from said heating to maintain said area at a temperature effectively below that of said peripheral area; preheating the thermoplastic sole-forming material, and injecting said preheated material in hot molten settable condition into said cavity while said peripheral area of said textile component is still at the elevated temperature to form an outer sole adhered to said textile component at said peripheral area upon setting of said preheated material.

2. Method of producing shoes as claimed in claim 1 wherein said last is solid metal and said remaining part is also solid metal with an insulating layer of a material selected from the group consisting essentially of epoxy, polyurethane, polyester, or mixtures of such resins.

3. Method of producing shoes as claimed in claim 1 wherein said last is solid metal and said remaining part is insulating material selected from the group consisting essentially of epoxy, polyurethane, polyester, or mixtures of such resins.

4. Method of producing shoes as claimed in claim 3 wherein said insulating material has particulate silicon filler.

* * * * *